US011200274B2

(12) United States Patent
Kong et al.

(10) Patent No.: US 11,200,274 B2
(45) Date of Patent: *Dec. 14, 2021

(54) METHOD OF E-COMMERCE

(71) Applicant: FashionLoyal Inc., New York, NY (US)

(72) Inventors: Sai Kong, New York, NY (US); Eric Entenman, Huntington, NY (US); Reza Mazaheri, Jersey City, NJ (US); Hooman Azmi, Tenafly, NJ (US)

(73) Assignee: FashionLoyal Inc., New York, NY (US)

( * ) Notice: Subject to any disclaimer, the term of this patent is extended or adjusted under 35 U.S.C. 154(b) by 538 days.

This patent is subject to a terminal disclaimer.

(21) Appl. No.: 15/698,175

(22) Filed: Sep. 7, 2017

(65) Prior Publication Data

US 2017/0371899 A1 Dec. 28, 2017

Related U.S. Application Data

(63) Continuation of application No. 14/203,271, filed on Mar. 10, 2014, now Pat. No. 9,785,654.

(60) Provisional application No. 61/775,052, filed on Mar. 8, 2013.

(51) Int. Cl.
*G06F 16/30* (2019.01)
*G06F 16/58* (2019.01)

(52) U.S. Cl.
CPC .................. *G06F 16/5866* (2019.01)

(58) Field of Classification Search
CPC .................. G06F 17/30268; G06F 16/5866
USPC .................. 707/722
See application file for complete search history.

(56) References Cited

U.S. PATENT DOCUMENTS

| 2005/0049914 A1* | 3/2005 | Parish | G06Q 20/10 |
| | | | 705/14.26 |
| 2012/0054060 A1* | 3/2012 | Kundu | G06Q 30/0603 |
| | | | 705/26.5 |
| 2013/0173402 A1* | 7/2013 | Young | G06Q 30/0631 |
| | | | 705/14.73 |

OTHER PUBLICATIONS

USPTO Non-Final Office Action dated Nov. 13, 2015, for corresponding U.S. Appl. No. 14/203,271.
(Continued)

*Primary Examiner* — Kuen S Lu
(74) *Attorney, Agent, or Firm* — Myers Wolin, LLC

(57) ABSTRACT

A system and method for providing search results is disclosed. One embodiment includes first presenting an image containing a product to a user and providing the user with a user interface for selecting the image, or a portion of the image associated with the product, from among several images. Search results are generated by searching for at least one characteristic based on one tag applied to the image or portion of the image in a database associated with a brand or designer identified in a second tag.

In another embodiment, a user is provided with an upload interface to upload and tag an image so that the image is tagged for use in generating and providing search results to an independent user.

17 Claims, 17 Drawing Sheets

(56) References Cited

OTHER PUBLICATIONS

Rung Andras: Principles of Effective Search In E-Commerce Design, Smashing Magazine, Dec. 8, 2009.
USPTO Non-Final Office Action dated Feb. 1, 2017, for corresponding U.S. Appl. No. 14/203,271.
USPTO Final Office Action dated Mar. 21, 2016, for corresponding U.S. Appl. No. 14/203,271.

* cited by examiner

| Source 700 | General category 710 | Sub-category 720 | Sub-category 730 | description categories 740 | contextual menus 750 |
|---|---|---|---|---|---|
| Designers | Shirt | Jeans | type 1 | Color | Winter |
| Brands | Pants | Dress pants | type 2 | Price | Spring |
| | Jacket | | type 3 | Season | Summer |
| | Top | | | Vintage | Autumn |
| | Dress | | | Social context | |
| | Handbag | | | Artistic classification | |
| | Accessories | | | | |

FIG. 5

METHOD OF E-COMMERCE

CROSS-REFERENCE TO RELATED APPLICATIONS

This application is a continuation of U.S. patent application Ser. No. 14/203,271, filed Mar. 10, 2014, which claims the benefit of U.S. Provisional Application No. 61/775,052, filed Mar. 8, 2013, the contents of which are incorporated by reference herein.

FIELD OF THE INVENTION

This disclosure relates to methods of e-commerce, online shopping, image uploading and viewing methods, as well as methods for searching for products within a social environment.

BACKGROUND

Online shopping and social media networks have grown dramatically in the past several years. Online shopping is currently performed primarily by searching for a specific item at the web site of an entity that may sell such an item, such as a retail store, or a brand or designer that produces the product sought. There are shopping oriented search engines that allow users to search across multiple stores or designers, as well as some websites that allow for comparison of products across multiple sources.

Some online shopping systems have integrated, to a limited degree, social media features into search engines by, for example, allowing a user to select a product suggested, or "liked," by colleagues, and by providing a user with search results indicating potential purchase locations for that product, or a general search for related products. Search results are generally either for purchase locations of the specific product or for similar products across multiple brands. Users of online shopping systems may prefer to shop or browse in a social environment and be presented with products from the same brand or designer as a product selected.

Alternatively, some online shopping systems have integrated, to a limited degree, search engines into social media platforms by, for example, allowing users to suggest, or "like" products, or by allowing users to upload images of themselves using products suggested. Once uploaded, many of the same limitations discussed above apply, making it difficult to search for similar products from an identical brand or designer as a product shown in a specified image.

Some online shopping systems are sponsored or supported by specific brands or designers, and require participating designers or sources to actively implement the system for the purposes of integration. Other systems require images of products to be tagged by designers or brands with details of the product according to a specified rubric. In some shopping systems requiring participation, brands or designers are incentivized to participate by being provided with an active style conscious audience for their brand. Such a website may have substantial trouble during a startup stage when few users are participating and when a brand or designer does not see significant potential exposure.

There is a need for a website that can provide users with images of products that a user can select for the purpose of shopping so that when a user selects a product, the user can be shown similar products from the same brand or designer as the brand or designer of the original product. There is a further need for such a system that does not require the participation of the designer or brand of the products being illustrated and searched for. There is a further need for a website allowing users to upload and prepare images for providing to other users so that products shown in those images can be selected for searching.

SUMMARY

In one embodiment, a computer system and a computer based method are provided for generating and providing search results to users, comprising first presenting an image containing a product to a user and providing the user with a user interface for selecting the image, or a portion of the image associated with the product, from among several images. Once the user selects the image or the portion of the image, the user is presented with search results based on tags applied to the product in the image, wherein a first tag is associated with the brand or designer of the product and at least one additional tag identifies at least one additional characteristic of the product. The search results are generated by searching for the at least one additional characteristic in a database associated with the tag identifying the brand or designer of the product.

In another embodiment, a user is provided with an upload interface to upload and tag an image so that the image is tagged for use in generating and providing search results to an independent user.

BRIEF DESCRIPTION OF THE DRAWINGS

FIG. 5 shows a table illustrating a potential image tagging structure to be used with the method of FIG. 2.

DETAILED DESCRIPTION OF THE PREFERRED EMBODIMENTS

Figure 1:
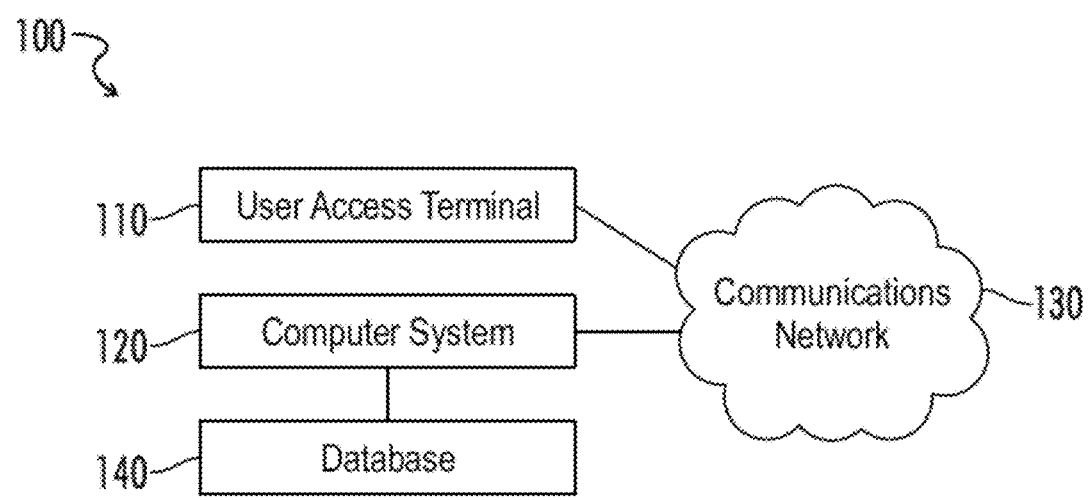
FIG. 1 is a simplified high level view illustrating a system 100 for performing a method in accordance with the current disclosure.

The description of illustrative embodiments according to principles of the present invention is intended to be read in connection with the accompanying drawings, which are to be considered part of the entire written description. In the description, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

In a preferred embodiment, a host provides a website on which users can perform two sets of primary functions, (1) viewing images, selecting products, and receiving search results, and (2) uploading and tagging images. The two functions act together to create a comprehensive user experience. On the website, a first user or group of users can upload and tag images that include products. The products can be articles of clothing or fashion accessories, and the images can be of the first user wearing the articles of clothing or that fashion accessory. In other embodiments, the image may be of articles of clothing or a fashion accessory that inspired the first user. A tag, in this context, means information attached to an image, product, or associated data file. Tagging is the application of a tag, or a small amount of data to the image, file, or associated data file, and may be done in an interface that prompts the inclusion of specific information in the tags, such as a source of the product and additional characteristics related to the product. The tagging need not be visible to a viewer of an associated image, and may be, for example, meta-tags.

Additionally, on the website, a second user or group of users may search for or browse images or products. The images may be, for example, the images uploaded and tagged by the first user or group of users. Each image includes tags indicating information including a source of the product and additional characteristics related to the product. When a user selects a product in an image by, for example, rolling over the product with a cursor, the website presents the user with search results from a database related to a source of the product (such as a brand or designer's website) based on the additional characteristics related to the product indicated in tags attached to the image or product. In some embodiments, the search results are active product listings from the source of the selected product, and each active listing includes a link for purchasing the product listed.

FIG. 1 is a simplified high level view illustrating a system 100 for performing a method in accordance with the current disclosure. In the system 100, at least one user access terminal 110 and a computer system 120 are capable of accessing a communications network 130, the computer system contains access to at least one database 140. The computer system 120 may be a server configured to implement systems and methods consistent with the present disclosure, or it may be a processing unit associated with user access terminal 110, and the database 140 may contain data required for performing the method of the disclosure. User access terminal 110 may include a web browser and may be used to access the communications network 120, which may be the internet.

Users of user access terminal 110 may be, for example, customers of a manager of the system and may use the web browser to access a website implementing the method of the present disclosure hosted on computer system 120. What follows is an example of interactions between users at user access terminals 110 and computer system 120. Other implementations are possible, and variations on the implementation below are possible. Some variations are indicated in the text.

Figure 2:
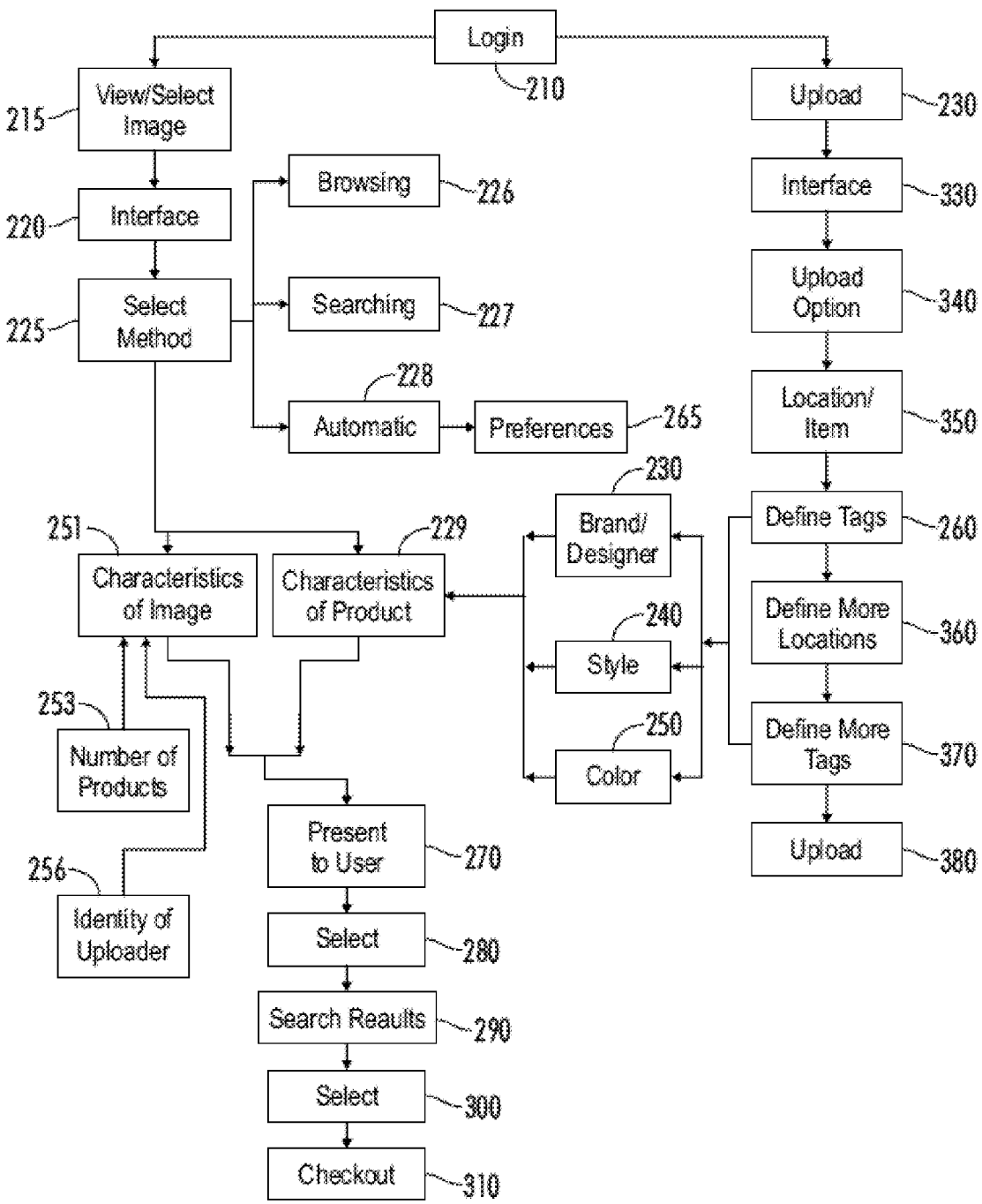
FIG. 2 shows a simplified flow chart outlining the steps of one implementation of the method of the disclosure.

FIG. 2 shows a simplified flow chart outlining the steps of one implementation of the method of the disclosure. As shown in the figure, a user first logs in to the website (210) at a first user access terminal 110 and decides to either view and select images (215) at a first interface 220 or upload images (230) at a second interface 330. In the discussion that follows, a user using a viewing and selecting interface 220 may be referred to as a "first user" or a "first group of users." Similarly, a user using an image upload interface 330 may be referred to as a "second user" or a "second group of users." It will be understood that this designation is to improve the clarity of the description, and that the users may be reversed in order, or may be the same user. In some embodiments, one of the two options may be a default option, so that when a user logs in to the website (210), the user may automatically be placed into, for example, an image viewing and selecting interface 220.

Once in image viewing and selecting interface 220, the first user may select various viewing methods (225) for selecting items, with each viewing method intended to generate a grouping of images having products selectable by the first user. These include browsing 226, searching 227, or an automated system for presenting images to the user 228. Any of the viewing methods 225 may rely on selecting appropriate images based on characteristics of a product 229 in a given image, such as brand or designer 230, style 240, or color 250 (any of which may be designated by tags, such as those defined by a second user 260, 370), and they may further rely on classification of an image's characteristics 251, such as the number of products 253 included in an image, or the identity of an uploading user 256. The automatic system for presenting images to users 228 may present images based on preferences 265 defined in a user profile, such as preferred characteristics of products or images.

Each viewing method results in the presentation of one or more images to the first user (270) from which the first user may select (280) a single image or a single product from a single image. The selection (280) may be a two tier process, with the first user selecting an image and then selecting a product from the image. Similarly, the browsing may be a multi-tiered process, with the first user winnowing images consecutively, based on classifications.

After the first user selection 280, the method provides the first user with search results 290 from which the first user may select (300) a product for purchase after which the first user is directed to an external checkout interface 310. The external checkout interface may be, for example, an interface at the website of the brand or designer of the product being purchased.

When a second user chooses to upload images, 230 the second user is directed to an upload interface 330 and selects an option to upload at least one image (340). The second user may then select a location or item within the image (350) and define tags (260) associated with that location or item. The second user may, optionally, define additional locations (360) within the image and define additional tags (370) to indicate more than one product present in the image prior to uploading both the images and the tags. The second user may then upload the image with the tags to the system (380). Once images are uploaded, the images may be shown to users as potentially selectable images (270).

Figure 3:
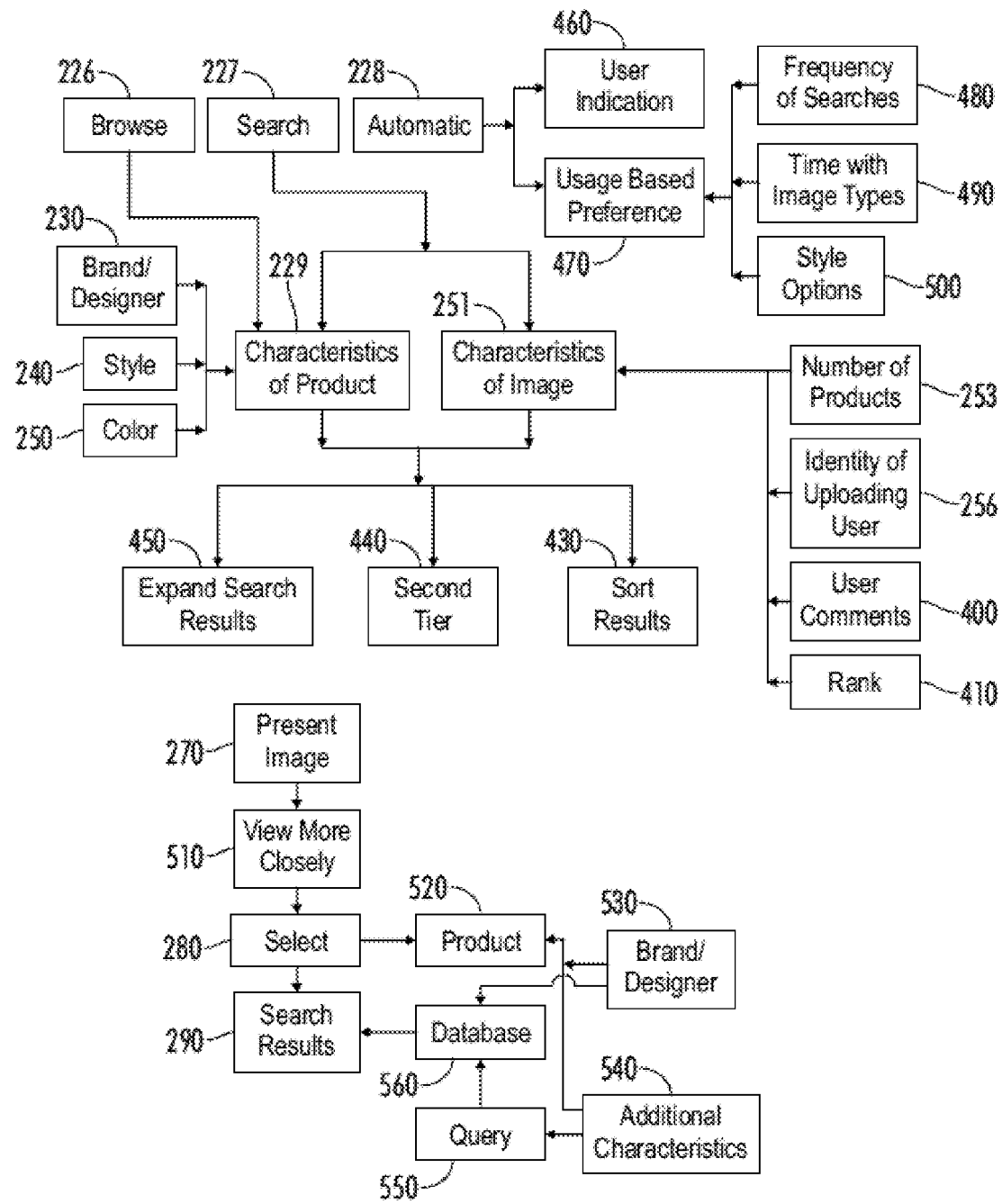
FIG. 3 shows a flow chart outlining, in greater detail, an interaction between a user and a website implementing the method of FIG. 2.

FIG. 3 shows a flow chart outlining, in greater detail, an interaction of a first user with an image viewing and selecting interface of a website in the implementation of FIG. 2. In the embodiment outlined, once the first user logs into the website (210), the first user may either browse for images (226), search for images (227), or be provided with images to review automatically (228).

If the first user chooses to search for images, the user may use a search bar to search (227) for any one or more characteristic of a product 229, including those defined in tags by, for example, the second user (260). In the case of articles of clothing or accessories, those characteristics may be, for example, brand or designer 230, style 240, or color 250 among others. The first user may further search for characteristics of the images themselves 251, such as the number of products in the image 253 or the identity of an uploading user 256 as well as user comments on the images 400, the images placement in a ranking algorithm 410, or some other factor associated with the image. The first user may, for example, input search queries comprising combinations of these characteristics, among others. Search queries provided may be Boolean search queries and may provide users with flexible options for searching images on the website. The first user may then sort search results (430) by the closest match to the search query provided or by the most popular images, users, or tags, among other potential ranking algorithms.

The first user may, instead of searching, browse images (226) using, for example, a dropdown menu. The first user may browse images by characteristics of the product contained in tags 260, such as brand or designer 230, style 240, or color 250. To facilitate browsing, a user may be presented with "channels" comprising, for example, images containing products from specified brands or designers. Browsing may also be by more abstract characteristics of the image 251, such as a ranking of the image 410 or user comments on the image 400. After selecting a category by which to browse images, a user may select a classification within that category in order to further reduce the number of images presented. In some embodiments, a first user may further narrow down images by selecting a second category to which an image must adhere 440. For example, a first user may choose to view only products created by a first designer that fall under a specified price. This type of tiering may be applied multiple times. Similarly, a user may expand (450) browsing results or search results by selecting, for example, two designers, and viewing images related to either of the two designers.

The first user may, instead of searching or browsing images, be presented with an automated selection of images (228) based on indicated 460 (in a user profile) or usage based 470 preferences. In some embodiments, the first user has filled in a user profile while registering for the website, and, in that profile, indicated preferences 470, such as characteristics of preferred products 230, 240, 250, or images 253, 256, that may be incorporated into a search. In other embodiments, the website may record previous activity of the first user during visits to the website, such as frequency of specified searches 480 or time spent viewing specific image types 490, and that previous activity may be incorporated into a search in addition to, or instead of, user indicated preferences 460. Using preferences derived in any of the above ways, among other possibilities, the method may provide a user with suggestions. The suggestions may be presented as search results or they may be presented as, for example, style options 500. A user that has recently searched for items fitting multiple characteristic based search results may be presented with an option to select results coordinated with one or more style based on those characteristics.

Regardless of which image viewing method the first user pursues, the user will then be presented with a set of one or more images (270) aligned with user preferences, selections, or searches based on the criteria discussed above. The first user may then select (280) an image, or a portion of an image, in order to view search results 290 associated with a product appearing in the image. In some embodiments, the first user may first select an image to view more closely (510), and then, once presented with a larger, or otherwise more detailed version of the image selected, select a portion of the image (280) representing a product appearing in the image.

The selection (280) of an image or a portion of an image may be effected by, for example, rolling over the image with a cursor, selecting on a touch screen, or clicking with a mouse. An image or portion of an image may also be selected by inputting a keyboard shortcut. Selectable portions of an image may be indicated by highlighting portions of an image, or by placing a marker, such as an icon over the image in a location indicating a specified product. In the preferred embodiment, each user selectable image or portion of an image contains at least one product 520, a tag identifying a brand or designer associated with the product 530, and at least one tag identifying at least one additional characteristic 540 associated with the product.

When the first user selects 280 an image or a portion of an image containing a product, the website submits a search query 550 based on the additional characteristic 540 to a database 560 selected based on the brand or designer 530 in order to find items similar to the product sought. The query submitted 550 to database 560 may be formulated in accordance with policies of the search database to which the query is submitted, or it may be customized to improve the efficiency of searching database 560. In some examples, syntax may be adapted to the recommended syntax for database 560.

The method then presents the first user with search results 290 comprising products similar to the product illustrated in the image or portion of an image selected. Because of the database 560 searched, each product is from the brand or designer or other source associated with the selection. Further, in the embodiment shown each product presented includes an option to buy 580. When the option to buy is selected, the first user may, for example, be directed outside of the website to the website of the brand or designer of the product in order to check out and purchase the product.

Figure 4:
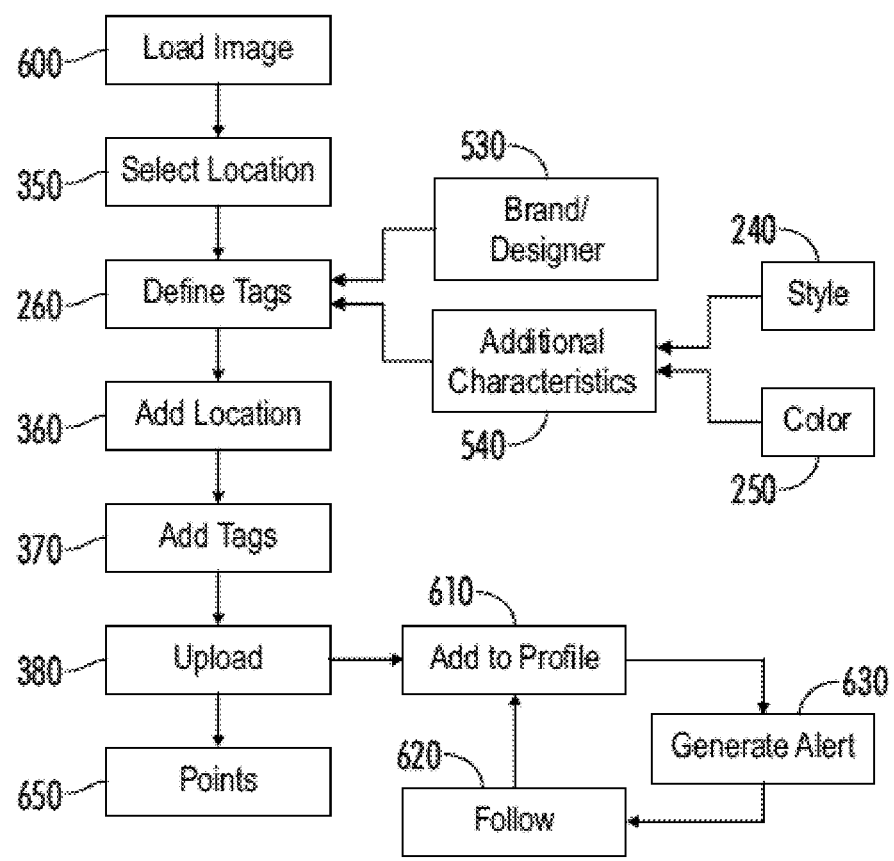
FIG. 4 shows a flow chart outlining, in greater detail, an interaction between a second user and a website implementing the method of FIG. 2.

FIG. 4 shows a flow chart outlining, in greater detail, an interaction of a second user with an image uploading interface of the method of FIG. 2. When a second user chooses to upload images (230), the second user is placed into an upload interface 330 and is provided with an option to upload at least one image (340). The second user may then load an image into the interface 600, select a location within the image corresponding to a product (350), and define tags (260) associated with the product indicated. The tags may provide several types of information, and each location identified within the image contains at least a first tag identifying a brand or designer associated with the product indicated 530, and at least one additional tag identifying at least one additional characteristic associated with the product 540. The at least one additional characteristic may be, for example related to style 240, or color 250, among other characteristics discussed elsewhere in this disclosure. In some embodiments, the second user is prompted to include specific tags by, for example, dropdown menus, or a sequence of prompts.

In some embodiments, the tags may include an explicit identification of the product shown so that the identification can be used in a search. In other embodiments, such explicit identification may be avoided, in order to avoid skewing search results towards a product based on a model number or name rather than more tangible aesthetic characteristics.

The second user may, optionally, define additional locations (360) within the image and define additional tags (370) to indicate more than one product present in the image. The user may then upload the image with the applied tags to the system (380). Once an image is uploaded, the image may be added to the website's interface, and it may be shown to third parties, including the first user, as a potentially selectable image (270).

In some embodiments, each user is provided with a public profile, and when the second user uploads an image, it is automatically added to the second user's profile (610). Such a profile may be selected for "following" by a third party (620), and the third party may be alerted 630 whenever relevant activity occurs within the second user's profile, such as adding a new image to a profile. An image uploaded may be labeled as "a picture of me" or "inspiration" or it may be custom titled by the user, and it may be sorted according to that description within the profile. Other schemes may be used by the system or the second user to organize the profile as well.

The method may further implement a point system, in which points 650 are applied to the second user when an image uploaded is presented to the first user (270) or selected by the first user (280), or when third parties choose to view or select the image. The second user may be further awarded points when third parties "follow" their profile (620). Point additions may be triggered by a user's own activity as well, such as when a user tags a product from a specified designer or visits brand or designer's "channel." Points may be broken down, for example, by brand or designer based on the images viewed or the user's profile makeup. The points awarded may be used for promotions sponsored by brands or designers, as well as the company hosting the website.

FIG. 5 shows a table illustrating a potential image tagging structure to be used with the method of FIG. 2. Using the structure within upload interface 330, the second user can tag an uploaded image to effectively describe a product contained therein. Although the figure shows a number of potential tags at each level of the tagging structure, it will be understood that the structure may be much broader, containing many descriptive terms for many different types of apparel or accessories. For each product indicated 350 in each image uploaded 380, at least two tags must be applied—one designating a source, and at least one designating at least one additional characteristic.

A source for the product is selected from a first list 700. In some embodiments, a designer or brand must be selected from the list in order to properly specify a database 560 to be searched. A user may be unable to upload an image (380) without selecting an option from list 700.

A general category of the product is then selected from a list 710. The product may be described as, for example, a shirt, pants, a jacket, a top, a dress, a handbag, or another type of accessory, among other potential descriptions. Each category may have potential subcategories as well. In one example, if the general description is "pants," the subcategories may be provided in a list 720 including jeans, dress pants, etc. Additional tiered subcategories may be selected from a secondary list 730 including, for example, types or styles of jeans or dress pants. The subcategories presented to a second user may vary depending on category 710 and first subcategory 720 selected.

The second user may further be presented with a list 740 of categories of descriptions for an article of clothing or accessory. Such categories may include, for example, color, price, appropriate season, vintage, appropriate social context, or artistic classifications, among many others. When a category is selected from list 740, the user may be further presented with a context based menu 750 presenting options for that category. For example, if the second user selects "appropriate season" from list 740, the user may be prompted to select from winter, spring, summer, and autumn.

In some embodiments, the second user can create and classify new tags which may be shown only to that user or can be presented to other users. In some embodiment, tags created, or tags most frequently used may be viewable through the second user's profile 610.

In some embodiments, each user may have a user profile 610 including options that can be used to provide recommendations and track preferences. Profile 610 may include, for example, preferred searches in standard categories, as well as a listing of descriptive tags that a user likes or dislikes. This information may be automatically generated for a user by tracking selections over a period of time. Profile 610 may also contain information usable to generate stylistic recommendations, including information about gender, measurements, body shape, skin tone, eye color, ethnicity, and hair color, among others. Similarly, profile 610 may also include information about styles normally worn, amount of money spent on clothing, and trendiness.

FIGS. 6A-J show an exemplary user interface that can be used to implement the method of FIG. 2. The figures illustrate a sequence a user may follow when using a website implementing the method of the disclosure. The user may first login by clicking the button 810 on the display. Once a user logs in, the website may access the users profile in order to determine previously selected or indicated brands 820, and present those brands to the user 830. The website may then provide news and social media feeds 840 to the user providing information from or related to those brands. The user may further select other brands 850 by either searching for a brand or reviewing and selecting from a list of top designers.

In order to upload images, a user may select an icon 860 indicating that feature, which may open an upload interface in which a user may browse to and open a local image file 870. The upload interface then displays the selected image 880, and allows the user to select a brand 900 and indicate where in the image a product from the selected brand is present 890.

A user uploading an image may then indicate characteristics of the indicated product other than brand 910, such as the general category of clothing, subcategories related to that category, and a color associated with the product.

Once tags are associated with a product in the image 920, the user may be provided with an option to indicate another product in the image by selecting a designer 930.

Figure 6A:
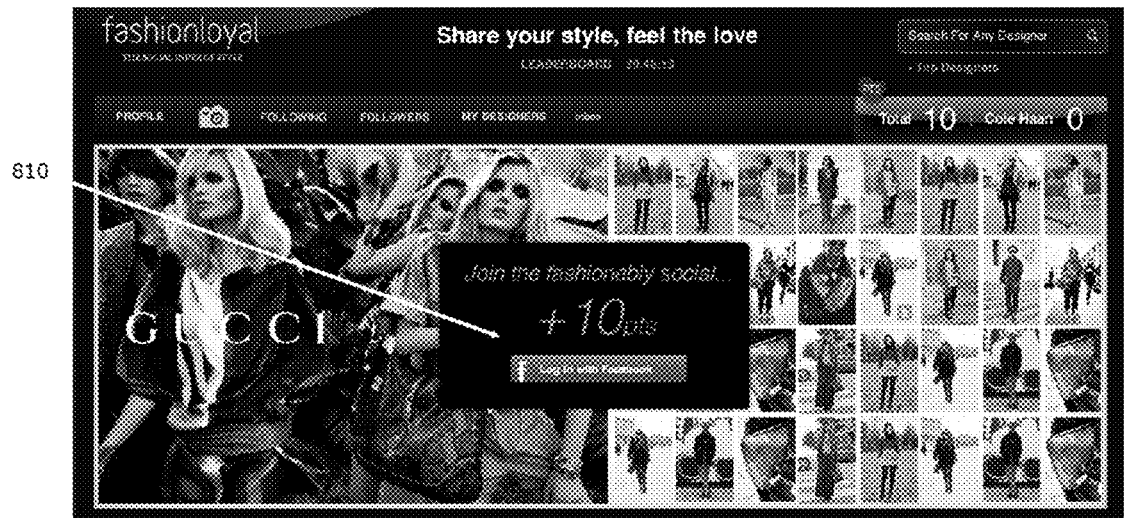
FIGS. 6A-J show aspects of an exemplary user interface that can be used to implement the method of FIG. 2.
Figure 6B:
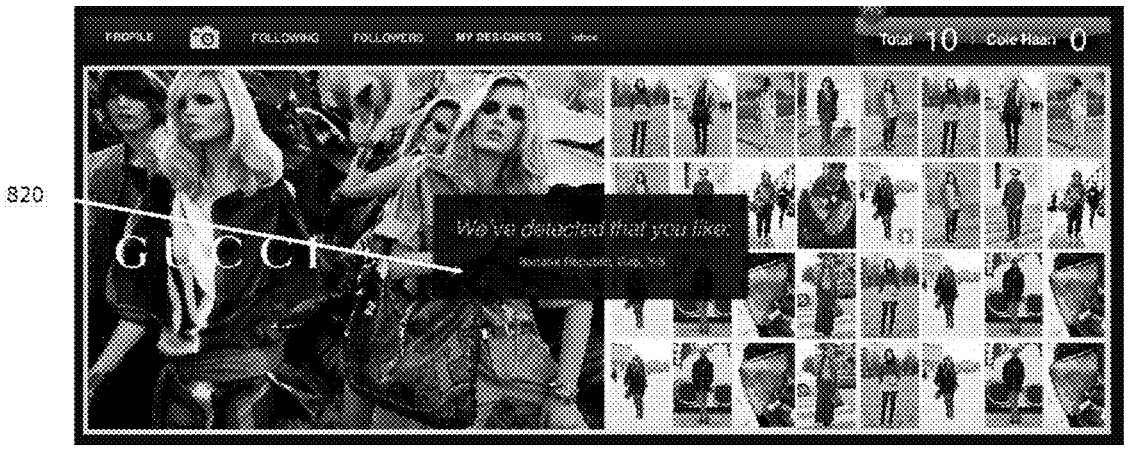
Figure 6C:
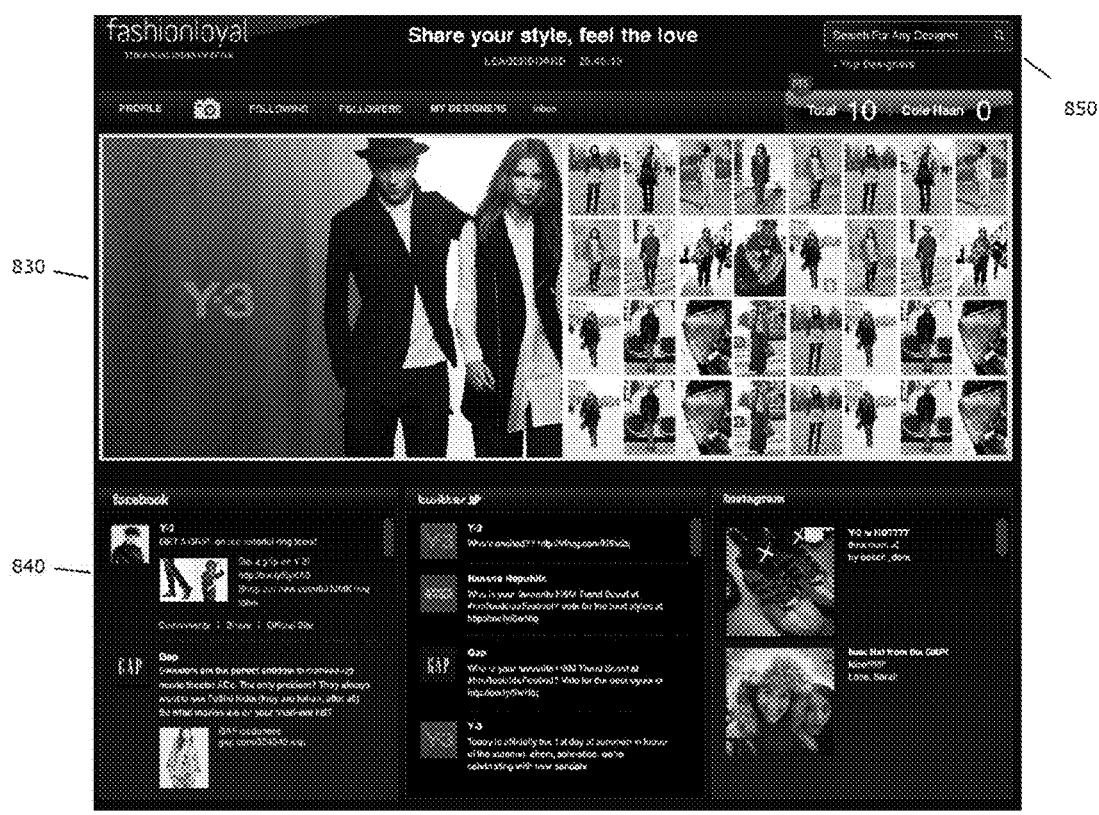
Figure 6D:
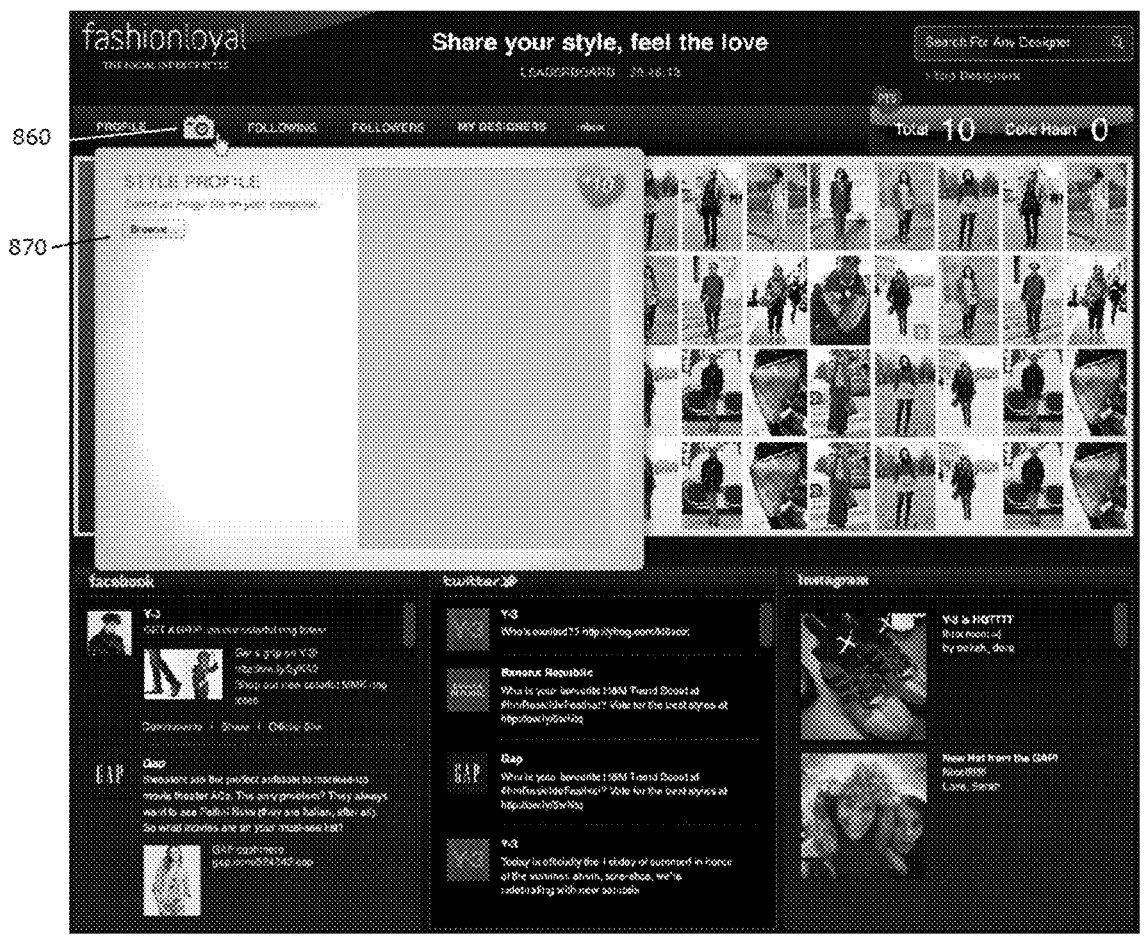
Figure 6E:
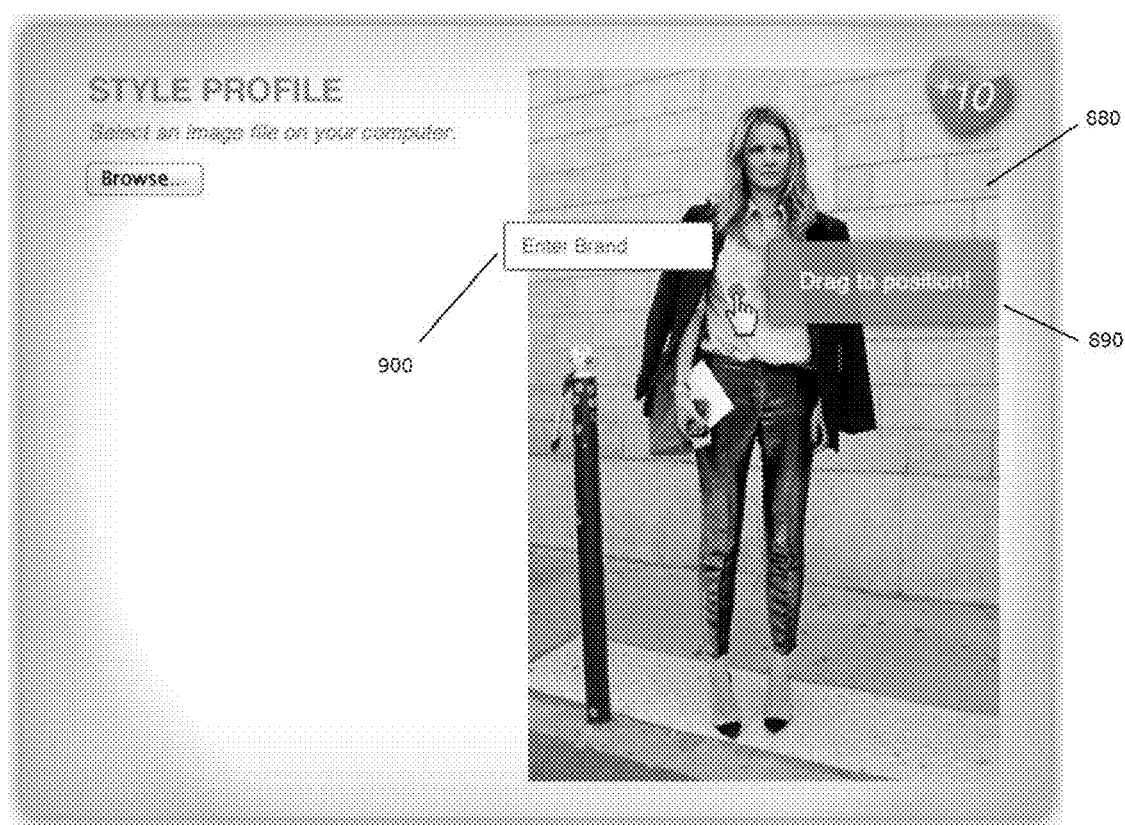
Figure 6F:
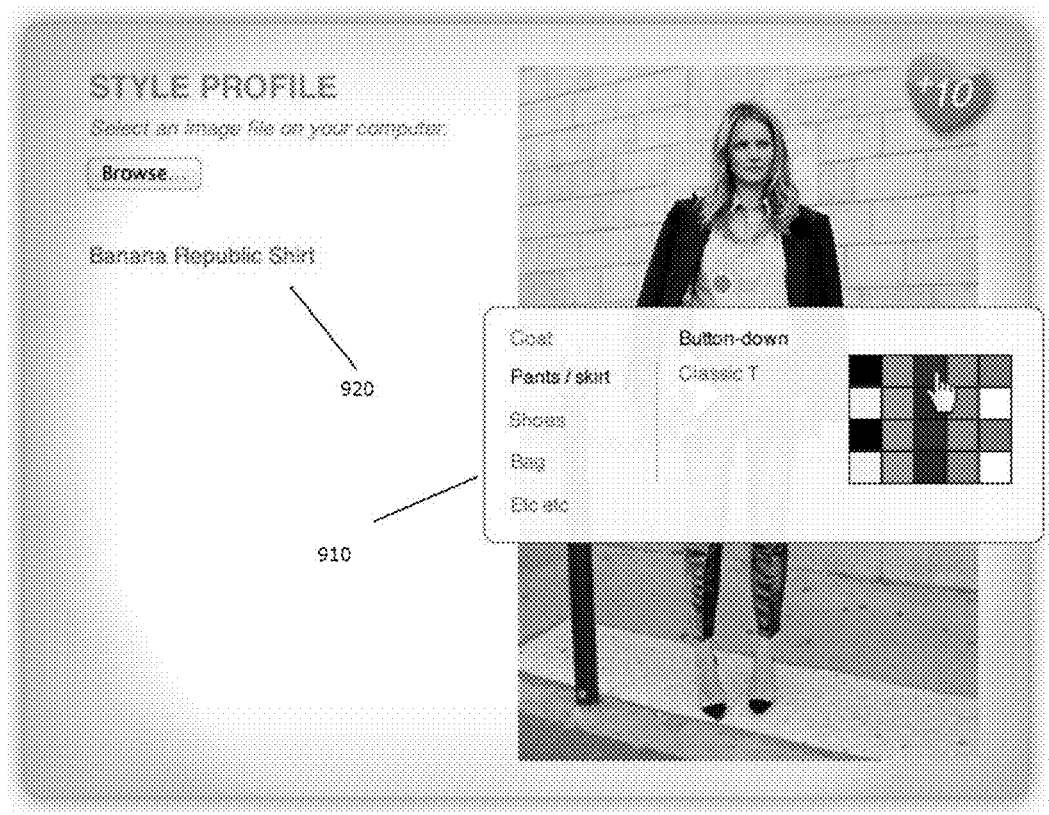
Figure 6G:
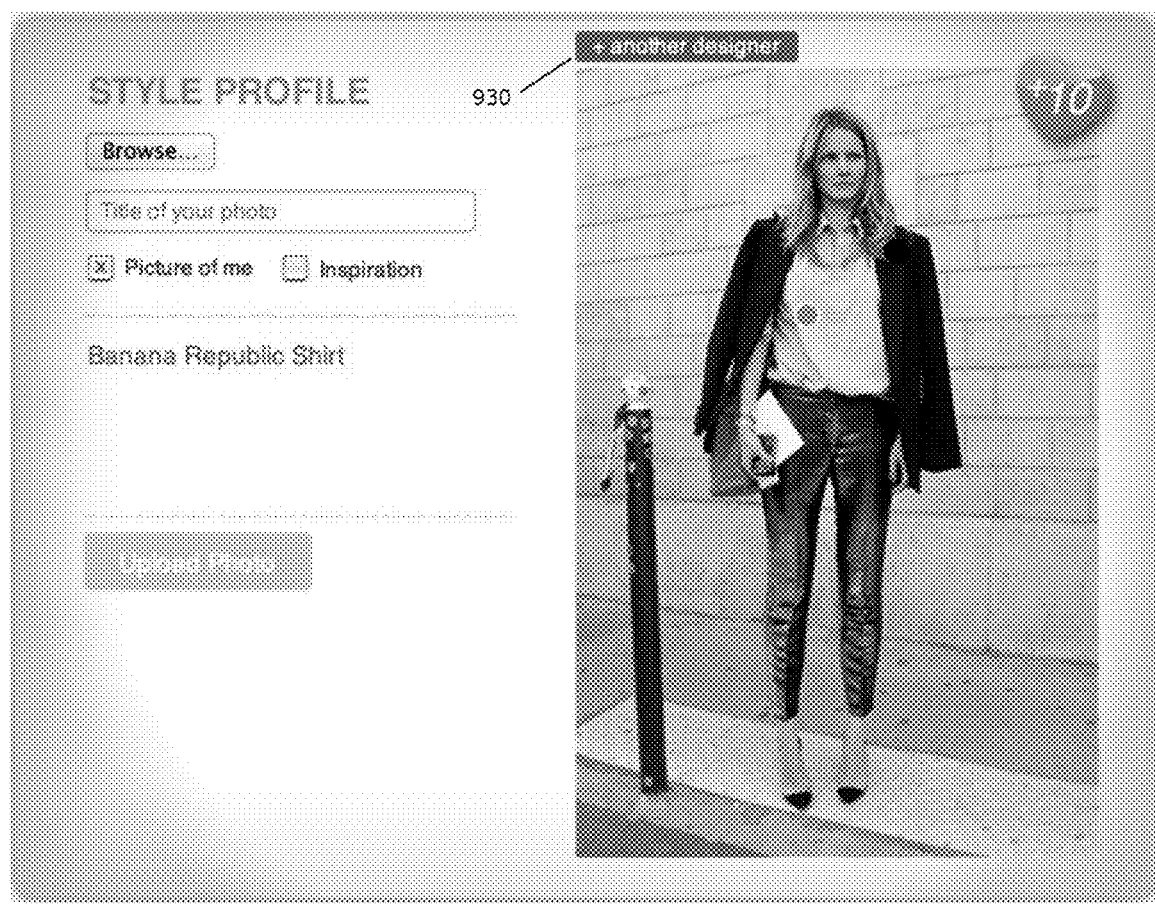
Figure 6H:
Figure 6I:
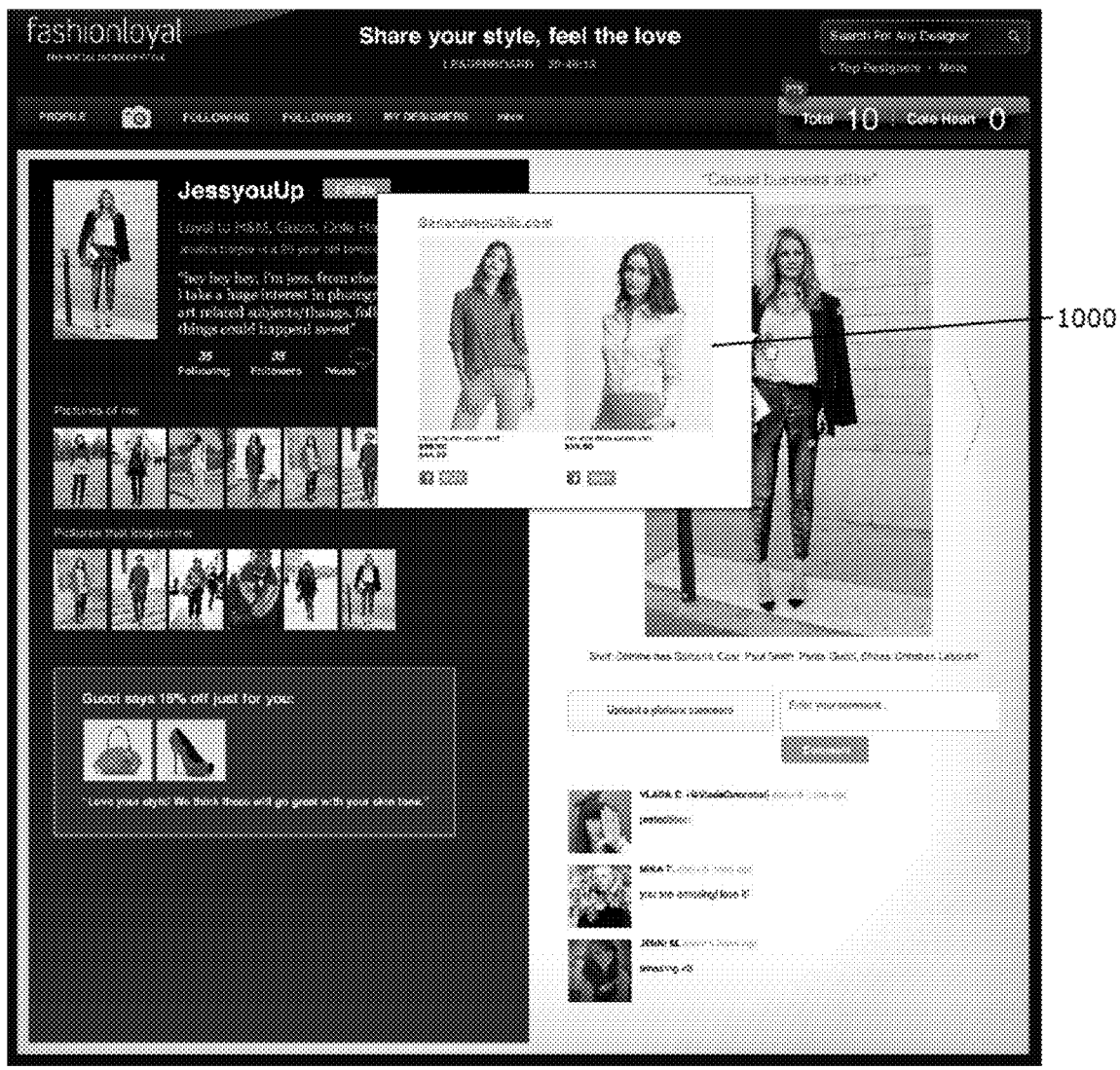
Figure 6J:

When all tags are assigned and the image is uploaded, the image may be added to the user's profile, shown in FIG. 6H. The image may be shown with various products indicated by icons 940, and the uploading of an image may add points 950 to a user's point total. The point totals and opportunities to add points are shown throughout the interface, and points may be general or may be associated with specific designers or brands. Designers and brands may provide discounts 960 based on a user's profile and/or a user's point total.

Third party users may comment on images in a user's profile 970, or they may comment on the user's profile generally. Images may be presented in various classification schemes, including dividing the images into images of other people that inspired the user 980 and images of the user 990.

Finally, a user may select an icon in the image, or a product within an image, by hovering a cursor above the icon for example, and may then be presented with search results comprising products from the brand associated with the product indicated by the icon and associated with the image 1000. Each search result may be presented with an option to buy the illustrated product. The search results 1000 may be presented in the user interface as a box hovering near the selected icon or product 1010. Alternatively the search results 1000 may be presented in the user interface as a sidebar 1020 to the image, thereby providing an unobstructed view of the image 920.

Figure 7A:
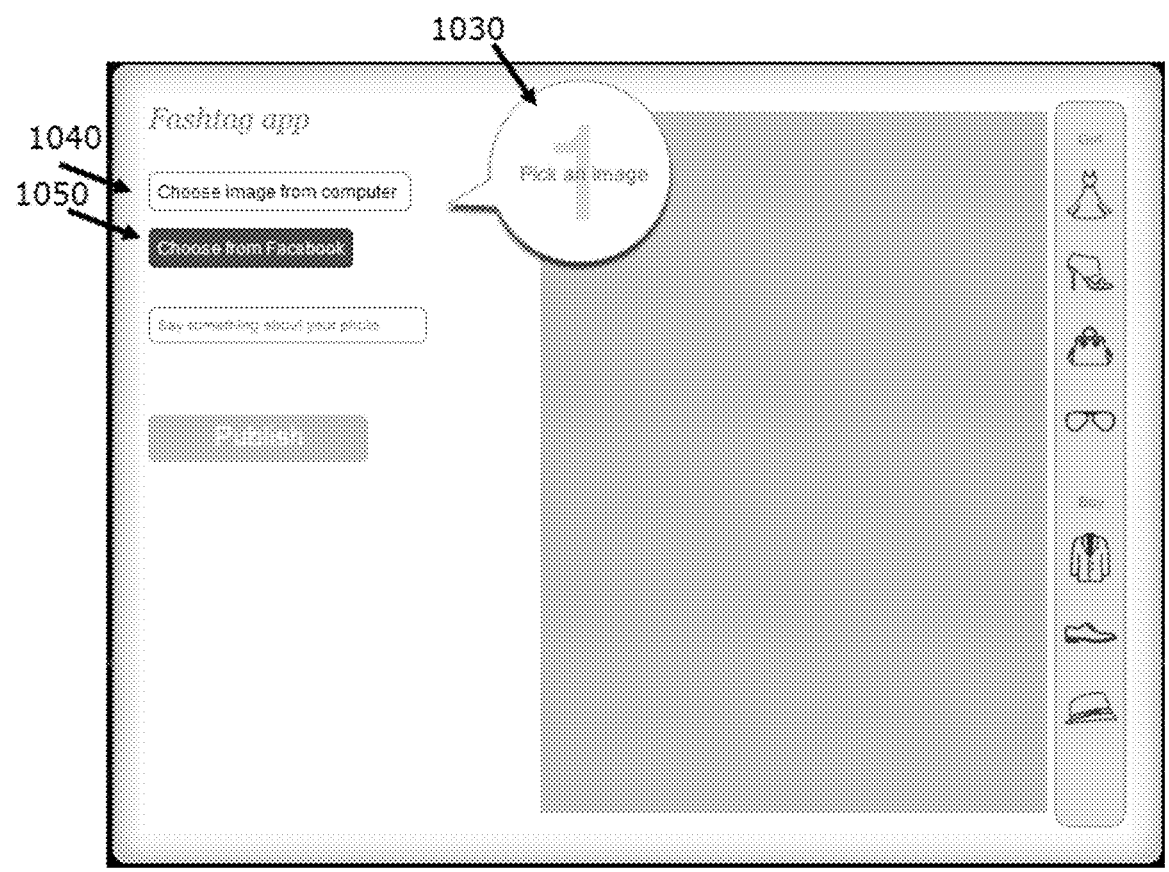
FIGS. 7A-C show aspects of an alternative exemplary user interface for uploading images within the method of FIG. 2.
Figure 7B:
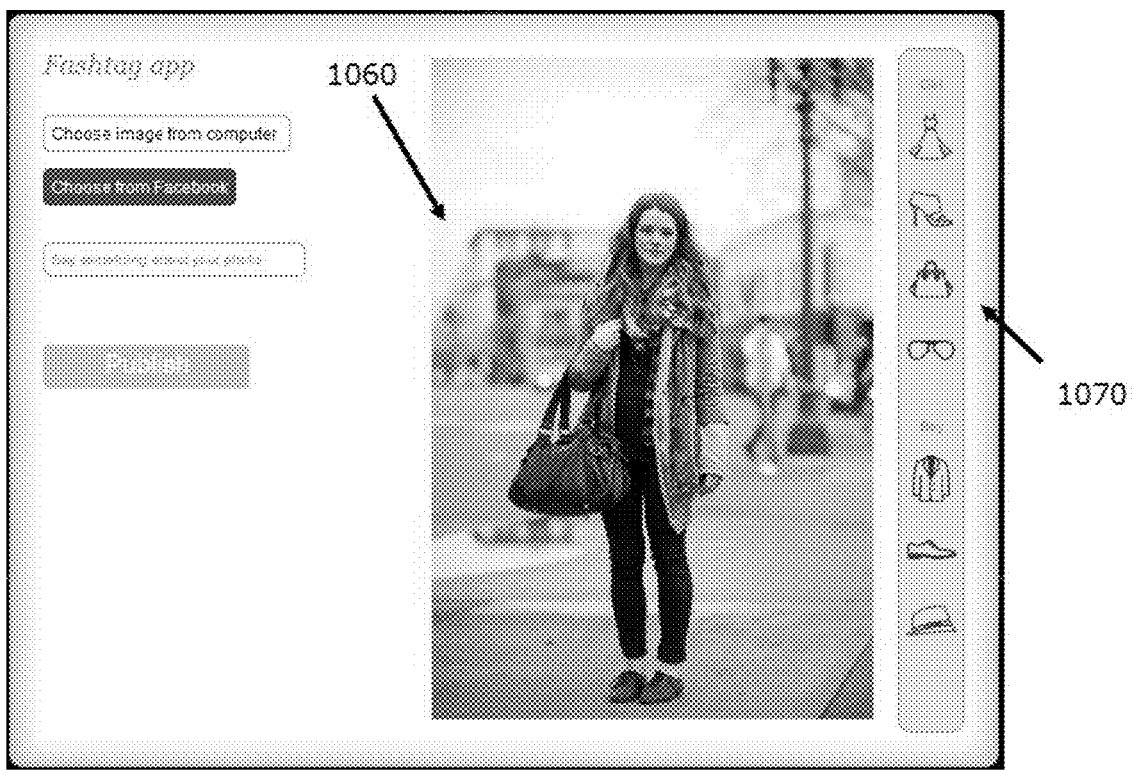
Figure 7C:

FIGS. 7A-C show aspects of an alternative exemplary user interface for uploading images within the method of FIG. 2. A user may access the alternative interface shown by selecting an icon 860 indicating the image upload feature. Once within the interface, a user may first select an image (1030). The user may do this by, for example, either selecting an option to browse to and open a local image file 1040. Alternatively the user may select an option to select an image from an internet location, including social media websites such as the platform itself or, for example, Facebook 1050.

The upload interface then displays the selected image 1060, and allows the user to classify the image by, for example, clicking and dragging an icon representing a product type 1070 to a relevant portion of the image. The icons 1070 may be classified as, for example, "boy" or "girl" products or product types select a brand 900 and indicate where in the image a product from the selected brand is present 890.

Once an icon 1070 is dragged to a relevant portion of the image, the user may be able to input additional details about the product. This can include the brand or source of the product 1080, as well as additional characteristics such as those discussed in reference to FIG. 5.

When all tags are assigned and the image is uploaded, the image may be published 1090, thereby adding the image to a user profile, such as that shown in FIG. 6H.

Embodiments of the subject matter and the operations described in this specification can be implemented in digital electronic circuitry, or in computer software, firmware, or hardware, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The term "computer system" or "computer-based method" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be indicated in the numbered paragraphs near the end of this disclosure, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially described in the numbered paragraphs near the end of this disclosure as such, one or more features from such a combination can in some cases be excised from the combination, and the combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer-based method for providing search results to users comprising:
   presenting at least one image containing at least one product at a user access terminal;
   providing a user interface at the user access terminal for a first user to select at least a portion of one image of the at least one image wherein the at least a portion is associated with a product shown in the selected at least a portion;
   accepting a selection from the first user of at least a portion of the one image; and
   presenting the first user with search results,
   wherein the at least a portion of the one image is associated with:
      a first tag identifying a first characteristic of the product; and
      at least one secondary tag identifying a second characteristic of the product in addition to the first characteristic,
   and wherein the one image is drawn from a single image file stored in an image file format,
   and wherein the search results are generated by:
      selecting a search database using the first tag; and
      generating a search query for searching the search database based on the second characteristic; and
      submitting the search query to the search database,
   wherein the search query based on the second characteristic is optimized for the search database selected using the first tag,
   wherein multiple selectable portions of the one image are defined and each is associated with one product.

2. The computer-based method of claim 1 further comprising:
   providing an upload interface for a second user to upload an image; and
   providing a tagging interface for the second user to tag the uploaded image,
   wherein the second user applies tags to at least a portion of the uploaded image, the tags comprising:
      a first tag identifying a first characteristic associated with the product; and
      at least one secondary tag identifying a second characteristic of the product in addition to first characteristic,
   wherein the uploaded image is one of the at least one image.

3. The computer-based method of claim 2 wherein all tags applied to a product are provided by the second user.

4. The computer-based method of claim 2 wherein the second user is assigned points based on user activities in relation to photos uploaded and wherein the points are associated with brands or designers and are used for brand or designer promotions.

5. The computer-based method of claim 1 wherein the first characteristic is a brand or designer of the product, and the second characteristic is at least one of:
   type;
   style; and
   color.

6. The computer-based method of claim 1 further comprising:
   presenting an option to the first user to purchase a product indicated in the search results.

7. The computer-based method of claim 6 further comprising directing the first user to a website of the brand or designer of the product upon the selection of the option to purchase a product indicated in the search results.

8. The computer-based method of claim 6 wherein the search results comprise products similar to the product associated with the at least a portion of the at least one image.

9. A computer-based method of presenting e-commerce products, comprising:
   providing an upload interface to a first user for uploading at least one image containing at least one product to a website;
   providing a tagging interface to the first user for applying tags to products in uploaded images;
   applying tags indicated by the first user to uploaded images, the tags including, for each product for which tags are applied:
      a first tag indicating a first characteristic of the product; and
      at least one secondary tag indicating a second characteristic of the product in addition to the first characteristic,
   providing a product selection interface to a second user for selecting a product for which tags are applied shown in an image uploaded to the website; and
   providing search results related to the first tag indicating the characteristic of the product provided in the at least one secondary tag from a search database selected based on the first tag,
   wherein distinct tags are applied to each of a plurality of products within a single image file stored in an image file format.

10. A computer system comprising:
    at least one user access terminal capable of accessing a communications network;
    a host computer capable of accessing the communications network; and
    a database associated with the computer system,
    wherein the host computer comprises a computer-based processor and a computer-based memory storage, and is configured to:
       present at least one image containing at least one product at a first user access terminal;
       provide a user interface at the first user access terminal for a first user to select at least a portion of one of the at least one image wherein the at least a portion is associated with a product shown in the selected at least a portion;
       accept a selection from the first user of at least a portion of the at least one image; and
       present the first user with search results,
       wherein the at least a portion of the at least one image is associated with:
          a first tag identifying a first characteristic of the product; and
          at least one secondary tag identifying a second characteristic of the product in addition to the first characteristic,
       and wherein the search results are generated by:
          selecting a search database using the first tag;
          generating a search query for searching the search database based on the at least one secondary tag; and
          submitting the search query to the search database,
       wherein multiple products are shown in the at least one image and the image has multiple selectable portions corresponding to each of the multiple products,
       wherein the search query based on the second characteristic is optimized for the search database selected using the first tag.

11. The computer system of claim 10, further comprising a second user access terminal, the host computer further configured to:
    provide an upload interface for a second user at the second user access terminal to upload an image; and
    providing a tagging interface for the second user to tag the uploaded image,
    wherein the second user applies tags to at least a portion of the uploaded image, the tags comprising:
       the first tag; and
       the at least one secondary tag,
    wherein the uploaded image is one of the at least one image.

12. The computer system of claim 11 wherein all tags applied to a product are provided by the second user.

13. The computer system of claim 11 wherein the second user is assigned points based on user activities in relation to photos uploaded and wherein the points are associated with brands or designers and are used for brand or designer promotions.

14. The computer system of claim 10 wherein the second characteristic is at least one of:
    type;
    style; and
    color.

15. The computer system of claim 10 wherein multiple selectable portions of the at least one image are defined and each is associated with one product.

16. The computer system of claim 10 the host computer further configured to:
    present an option to the first user to purchase a product indicated in the search results.

17. The computer system of claim 16, the host computer further configured to direct the first user to a website of the brand or designer of the product upon the selection of the option to purchase a product indicated in the search results.

* * * * *